United States Patent [19]
Wiseman et al.

[11] 3,859,115
[45] Jan. 7, 1975

[54] PRODUCTION OF COATED TIO$_2$ PIGMENTS

[75] Inventors: Thomas James Wiseman, Richmond; Peter Barry Howard, Yarm, both of England

[73] Assignee: British Titan Limited, Billingham, England

[22] Filed: Mar. 2, 1973

[21] Appl. No.: 337,573

[30] Foreign Application Priority Data
Mar. 23, 1972  Great Britain.................... 13724/72

[52] U.S. Cl.......... 117/70 A, 106/308 B, 117/70 D, 117/100 B
[51] Int. Cl............................................... B44d 1/14
[58] Field of Search............ 117/100 B, 70 A, 70 D; 106/300, 308 B, 309

[56] References Cited
UNITED STATES PATENTS

| | | | |
|---|---|---|---|
| 3,513,007 | 5/1970 | Lederer.......................... | 106/308 B |
| 3,591,398 | 7/1971 | Angerman....................... | 106/308 B |
| 3,767,455 | 10/1973 | Claridge et al................. | 117/100 B |

*Primary Examiner*—William D. Martin
*Assistant Examiner*—Dennis C. Konopacki
*Attorney, Agent, or Firm*—Schuyer, Birch, Swindler, McKie & Beckett

[57] ABSTRACT

Treatment of titanium dioxide by adding to an aqueous suspension thereof containing a water-soluble silicate an acidic source of a soluble oxide of aluminium while maintaining the pH of the suspension at a value of from 3 to 4.5 to precipitate a hydrous oxide of silicon and then completing the precipitation of the hydrous oxide of aluminium by raising the pH of the suspension.

14 Claims, No Drawings

PRODUCTION OF COATED TIO PIGMENTS

BACKGROUND OF THE INVENTION

This invention relates to a process for the production of a pigment, particularly titanium dioxide pigment.

For many years it has been the practice to coat titanium dioxide pigments with one or more hydrous oxides of silicon, aluminium or titanium to modify the properties of the pigment when used.

When the pigment is to be used in a paint it is desirable that the pigment should exhibit a high degree of photochemical stability i.e. durability. Pigments that are not sufficiently photochemically stable interact with light and produce reactive species which result in degradation of the binding medium i.e. resin or film forming polymer, with the eventual breakdown of the paint film taking place.

Coating processes for titanium dioxide pigment have been described in U.S. Pat. Nos. 3,146,119, 3,251,705, 3,522,078, 3,513,007 and 3,515,566. Typically these patent specifications described various alternative treatment processes for titanium dioxide pigments to modify the properties of the pigment when used. Many of such processes involve the treatment of the pigment with mixed hydrous oxides of aluminium, silicon and titanium and the application of double coatings.

Alternative processes involve the calcination of coated titanium dioxide pigments to dehydrate the coatings to produce a pigment said to have a high durability. Further processes involve the deposition of a hydrous oxide of silica from an active source of silica under carefully controlled conditions followed by the deposition of an outer coating of a hydrous oxide of aluminium.

It is desirable to produce a process for coating titanium dioxide pigment which has an extremely high durability whilst retaining an acceptible opacity and it is the object of the present invention to achieve such a pigment by a relatively simple process and by a process which can be easily commercially operated.

SUMMARY OF THE INVENTION

According to the present invention a process for the production of pigmentary titanium dioxide comprises forming an aqueous suspension of particles of titanium dioxide containing a water-soluble silicate, adding to the so formed suspension an acidic source of a soluble oxide of aluminium while maintaining the pH of the suspension at a value of 3 to 4.5 and thereby precipitating a hydrous oxide of silicon on the particles and raising the pH of the suspension to effect complete precipitation of a hydrous oxide of aluminium on the particles.

DETAILED DESCRIPTION OF THE INVENTION

The process of the present invention generally involves the coating of titanium dioxide with a hydrous oxide of silicon and a hydrous oxide of aluminium in a specified manner. Initially a suspension of titanium dioxide is prepared.

The titanium dioxide suspension can be prepared by mixing the pigment with water with a dispersing agent, if necessary, or it can be the slurry obtained when milling a titanium dioxide pigment. The pigment can be that prepared by the "sulphate" process in which concentrated sulphuric acid is employed to digest a titaniferous ore with subsequent dissolution of the digestion cake, hydrolysis and calcination of purified titanium dioxide or alternatively the pigment can be that obtained by the vapour phase oxidation of a titanium tetrahalide. Preferably the pigment is prepared by the vapour phase oxidation of titanium tetrachloride.

The titanium dioxide pigment can be either the anatase form or rutile form but preferably the pigment is the rutile form. Usually the pigment will have an average crystal size of 0.15 to 0.3 microns preferably of 0.2 to 0.25 microns.

Often it is desirable to employ a dispersing agent to assist the dispersion of titanium dioxide in water to form an aqueous suspension or slurry, particularly in the case of pigments prepared by the sulphate process. A typical dispersing agent is an alkali metal silicate, e.g. sodium silicate and when such a silicate is used then this will be present at the commencement of the coating process according to the present invention and will, accordingly, form at least a part of the source of the hydrous oxide of silicon.

Usually it will be necessary to add to the aqueous suspension of titanium dioxide a water-soluble silicate to form the source of the hydrous oxide of silicon. Typically, this source is an alkali metal silicate such as one of the commercially available forms of sodium silicate or potassium silicate but preferably it is the sodium silicate that is used. The amount added will depend on the amount of sodium silicate already present as a dispersing agent and on the amount of the coating of the hydrous oxide of silicon that it is desired to deposit on the pigment.

The precipitation of the hydrous oxide of silicon on the pigment is effected at a pH of between 3 and 4.5 in the presence of a soluble oxide of aluminium. In fact, it is the interaction between the soluble oxide, which is acidic in nature, and the silicate which effects the precipitation.

Usually the precipitation is effected at a pH between 3.5 and 4.2, preferably between 3.8 and 4.2. Generally, the pH of the aqueous suspension containing the silicate is reduced from its intial alkaline pH to no more than 4.5 prior to addition of the acidic source of soluble oxide of aluminium or the soluble oxide itself. The reduction of pH can be effected by the addition of an acid, usually a mineral acid such as sulphuric acid. Preferably the acid is added as quickly as possible.

The acid soluble oxide species can be formed in situ in the aqueous suspension or can be formed before addition to the aqueous suspension. An acidic water-soluble salt of aluminium can be added to the aqueous suspension while maintaining the pH at between 3 and 4.5 by adding an alkali usually simultaneously with the water-soluble salt.

Examples of acidic salts which may be used as the source of the soluble oxide of aluminium are water-soluble inorganic salts such as aluminium sulphate, aluminium nitrate, and aluminium chloride. Usually the salt will be added to the aqueous suspension in the form of an aqueous solution.

The soluble oxide of aluminium can be formed prior to the addition to the aqueous suspension by adding an alkali to a solution of aluminium salt. The addition of alkali is usually stopped just before the onset of precipitation of insoluble metal hydroxide. For best results the temperature of the solution is maintained at a temperature of 60°C to 95°C, usually about 90°C during the formation of the soluble species. Typically aqueous sodium hydroxide is added to an aqueous solution of aluminium chloride at 90°C until the molar ratio OH:Al is 2.2.

If desired, a source of a phosphate can be added to the aqueous suspension usually after adding the solution of the soluble oxide species. Typical sources of a phosphate are sodium di-hydrogen phosphate and orthophosphoric acid.

On addition of the soluble metal oxide species or its generation in situ at a pH between 3 and 4.5, deposition of a hydrous oxide of silicon occurs on the pigment particles. At the same time, precipitation of a basic salt or the hydrous oxide of the metal takes place. The most preferred pH at which the deposition takes place is between 3.8 and 4.2 to ensure the maximum deposition of the hydrous oxide of silicon and the minimum resolution of the hydrous oxide of silica from the surface.

When the desired amount of hydrous oxide of silicon has been deposited the pH of the aqueous suspension is raised to effect the complete precipitation of the hydrous oxide of aluminium, Usually, it is necessary to raise the pH to a value of at least 5 and often the pH is raised to at least 7.5, say 8.5.

The amount of the coating of hydrous oxide of silicon applied to the pigment is usually from 0.5 percent to 20 percent of the weight of $TiO_2$, preferably from 2 percent to 6 percent by weight. The amount of hydrous oxide of aluminium which is precipitated on the particles is usually from 0.1 percent to 15 percent (as the oxide) preferably 0.5 to 5% by weight of $TiO_2$. If desired, initially a small amount of the source of the soluble oxide of aluminium can be added at the appropriate pH level to effect the precipitation of the silica an then a further quantity can be added.

It is preferred to apply a further coating of one or more hydrous oxides to the coated pigment after treatment according to the process of the invention. Typical hydrous oxides that can be present in the further coating are those of aluminium, titanium, cerium, zirconium, zinc or of silicon. For example, the coating can be formed by adding to the suspension of the coated pigment a water-soluble hydrolysable salt or mixture thereof or a solution thereof and adjusting the pH to effect the precipitation of the coating. The salt can either be an acid reacting salt in which case it is usual to raise the pH of the suspension to at least 7 prior to the addition of the salt or the salt can be an alkaline reacting salt such as sodium aluminate when this and sodium hydroxide can be added directly to the aqueous suspension of coated pigment without the prior adjustment of pH in the process of the invention. The initial addition of the sodium aluminate serves to increase the pH.

The pH of the aqueous suspension is usually finally adjusted to a value in the range pH 6.5 to 8.5 to obtain the required final packed pigment pH and to effect the complete precipitation of the further coating.

Usually, the further coating will contain a hydrous oxide, preferably of aluminium, in an amount of from 0.1 to 10% (as the oxide) by weight, preferably 0.5 to 5% by weight on $TiO_2$. Optionally, a hydrous oxide of silicon can also be present in an amount of 0.1 to 10% by weight of $TiO_2$, preferably 0.25 to 5% by weight.

The coated pigment is separated, usually by filtration, from the aqueous suspension, dried and, if desired, fluid energy milled.

The coated pigments obtained by the process of the present invention have a high durability when used in paint as compared to a pigment having a coating of hydrous silica, hydrous alumina and hydrous titania applied by conventional methods.

The invention is illustrated in the following examples in which reference will be made to two types of further coatings (A or B) which are applied as follows:

COATING A

Add to the suspension dropwise 0.25% $SiO_2$ (as sodium silicate solution containing the equivalent of 100 grams/litre $SiO_2$) followed by 0.75% $Al_2O_3$ (as aluminium sulphate solution containing the equivalent of 100 grams/litre $Al_2O_3$) with the % amounts being based on the weight of $TiO_2$. Finally, the aqueous suspension is neutralised to pH 8.5 by adding sodium hydroxide solution.

COATING B

The pH of the aqueous suspension is raised to 10.5 by the addition of an aqueous solution of sodium aluminate containing sodium hydroxide. The amount of sodium aluminate added is sufficient to provide as desired 0.3% to 2.0% $Al_2O_3$ on $TiO_2$. The pH of the suspension is then lowered to approximately 6.5 by adding sulphuric acid.

In some of the following Examples an uncoated rutile titanium dioxide pigment prepared by the vapour phase oxidation ("chloride" process) of titanium tetrachloride was used. The pigment was slurried in water. The slurry contained 200 grams per litre of $TiO_2$. In the other Examples uncoated rutile titanium dioxide pigment prepared by the sulphate process was used as a similar slurry.

All the % amounts of ingredients added are based on the weight of $TiO_2$.

Constant stirring was maintained throughout all the experiments.

EXAMPLE 1

An aqueous slurry of a "chloride" titanium dioxide pigment containing 500 grams $TiO_2$ was heated to 45°C and to the slurry there was added an aqueous solution of sodium silicate containing the equivalent of 100 grams/litre $SiO_2$. in an amount sufficient to introduce the equivalent of 4% $SiO_2$. The pH of the mixture was adjusted to 4 by the addition of dilute hydrochloric acid.

A coating solution was prepared by adding 1N aqueous sodium hydroxide solution to an 0.8M aqueous solution of aluminium chloride at 90°C, the addition of sodium hydroxide being terminated when the molar ratio OH:Al was 2.2.

An amount of the coating solution sufficient to contain the equivalent of 1.0% $Al_2O_3$ was added to the slurry while the pH of the slurry was maintained within the range 3.8 to 4.2 by the simultaneous addition of aqueous sodium hydroxide solution.

To the slurry there was then added a 1N aqueous solution of sodium dihydrogenphosphate in an amount sufficient to introduce the equivalent of 0.45% $P_2O_5$. Finally, further Coating B containing sodium aluminate in an amount equivalent to 0.6% $Al_2O_3$ was applied to the pigment which was then recovered, washed, dried and fluid energy milled.

EXAMPLE 2

A slurry of a chloride titanium dioxide pigment containing 500 grams $TiO_2$ was heated to 45°C and there was added to the slurry aqueous sodium silicate solution containing the equivalent of 100 grams/litre $SiO_2$ in an amount sufficient to introduce the equivalent of 4% $SiO_2$. The slurry was acidified to pH 4 with dilute hydrochloric acid and the temperature then raised to 90°C.

The coating solution as described in Example 1 was then added in an amount sufficient to introduce 1% $Al_2O_3$ simultaneously but separately with sodium hydroxide solution to maintain the pH of the slurry in the range 4.0 to 4.5. The slurry was then allowed to cool to 45°C.

Further coating B using an amount of sodium aluminate equivalent to 0.3% $Al_2O_3$ was then applied and the pigment recovered, washed dried and fluid energy milled.

EXAMPLE 3

A slurry of a sulphate titanium dioxide pigment containing the equivalent of 0.8% $SiO_2$ as sodium silicate as dispersant was heated to 45°C and an aqueous solution of sodium silicate was added similar to that used in the previous Examples but in an amount equivalent to 3.2% $SiO_2$.

The slurry was acidified with dilute sulphuric acid to pH 4. A solution of aluminium sulphate containing the equivalent of 100 grams/litre $Al_2O_3$ was added in an amount sufficient to introduce the equivalent of 1% $Al_2O_3$ simultaneously and separately with sodium hydroxide solution to maintain the pH at 4.0. The slurry was then stirred for one hour.

Further Coating A was then applied to the pigment which was recovered, washed, dried and fluid energy milled.

EXAMPLE 4

Example 3 was repeated except that the slurry was acidified to pH 4 with dilute hydrochloric acid and the subsequent precedure was as described in Example 1.

EXAMPLE 5

Example 4 was repeated except that the slurry was acidified to pH 4.5 with dilute hydrochloric acid and then heated to 90°C. The coating solution as described in Example 1 containing an amount equivalent to 1% $Al_2O_3$ was added simultaneously but separately with sodium hydroxide to maintain the pH in the range 4.0 to 4.5. An aqueous solution of sodium dihydrogenphosphate was then added in an amount equivalent to 0.45% $P_2O_5$.

Further Coating B using an amount of sodium aluminate equivalent to 0.4% $Al_2O_3$ was then applied and the pigment recovered, washed, dried and fluid energy milled.

EXAMPLE 6

A slurry of a chloride titanium dioxide pigment having a pH of 4 was heated to 45°C and aqueous sodium silicate solution containing 100 grams/litre $SiO2$ was added in an amount sufficient to introduce the equivalent of 4% $SiO_2$. The pH of the slurry was then reduced to 4 with dilute sulphuric acid.

The slurry was heated to 90°C and the aqueous aluminium sulphate solution containing the equivalent of 100 grams/litre $Al2O_3$ was added in an amount sufficient to introduce the equivalent of 1% $Al_2O_3$ separately and simultaneously with sodium hydroxide solution to maintain the pH in the range 3.8 to 4.2.

The slurry was allowed to cool to 45°-50°C and Further Coating B using an amount of sodium aluminate equivalent to 1.5% $Al_2O_3$ was applied to the pigment which was then recovered, washed, dried and fluid energy milled.

EXAMPLE 7

A slurry of a chloride titanium dioxide pigment was heated to 45°C and to this slurry there was added aqueous soldium silicate solution/containing the equivalent of 100 grams/litre $SiO_2$ in an amount sufficient to introduce the equivalent of 4% $SiO_2$. The pH of the slurry was adjusted to 4 with dilute sulphuric acid and the slurry was then heated to 70°C. Aqueous aluminium sulphate solution containing the equivalent of 100 grams/litre $Al_2O_3$ was then added in an amount sufficient to introduce the equivalent of 1% $Al_2O_3$ simultaneously but separately with sodium hydroxide solution to maintain the pH in the range 3.8 to 4.2. An aqueous solution of sodium dihydrogenphosphate was then added in an amount of 0.2% $P_2O_5$.

Further Coating B using an amount of sodium aluminate equivalent to 2% $Al_2O_3$ was then applied and the pigment recovered, washed, dried and fluid energy milled.

EXAMPLE 8

A slurry of a chloride titanium dioxide pigment was heated to 45°C and an aqueous solution of sodium silicate containing the equivalent of 100 grams/litre $SiO_2$ was added in an amount sufficient to introduce the equivalent of 1% $SiO_2$. The pH of the slurry was adjusted to 4 with dilute sulphuric acid and the slurry was then heated to 70°C. A further quantity of the solution of sodium silicate sufficient to introduce the equivalent of 3% $SiO_2$ was introduced simultaneously and separately with a quantity of aluminium sulphate solution containing the equivalent of 100 grams/litre $Al_2O_3$ in an amount sufficient to introduce the equivalent of 1% $Al_2O_3$ to maintain the pH of the slurry in the range 3.5 to 4.0

Coating B using sodium aluminate in an amount equivalent to 2% $Al_2O_3$ was then applied and the pigment recovered, washed, dried and fluid energy milled.

The pigments produced in the preceding Examples were tested to determine their opacity. The opacity was measured by determining the reflectance in a Harrison Colourmeter of a paint film on a glass panel based on a long oil, pentaerythritol-modified, alkyd resin containing the particular pigment in a pigment volume concentration for a pigment of Examples 1 to 6 of 10% and for the pigment of Examples 7 and 8 in a pigment volume concentration of 20%. The glass panel is placed in optical contact with a black tile to determine the reflectance.

The durability of the pigment when incorporated in a stoving enamel based on an acrylic polymer was measured for the pigment of Examples 1 to 6 by determining the gloss retention of the stoved paint after exposure in a Marr Weatherometer for various times. For the pigment of Examples 7 and 8 the durability (i.e. gloss retention) was determined after similar exposure in the form of a paint based on an air drying alkyd resin.

The results are compared with similar paints containing a control pigment of extremely high durability. The control pigment was prepared by coating titanium dioxide by adding to an aqueous suspension a silicate simultaneously with dilute acid to maintain a pH of 9 followed by the application of an outer coating of hydrous alumina. The amount of hydrous silica deposited was 4% expressed as $SiO_2$ by weight of $TiO_2$ and the amount of hydrous alumina coating was 2% expressed as $Al2O_3$ by weight of $TiO_2$.

As appropriate the control pigment was prepared from either a chloride pigment or a sulphate pigment. Also due to the testing procedure employed three control paints were prepared at the appropriate time for comparison with pigments from Examples 1 and 2, Example 6, and Examples 7 and 8 respectively. The results are shown in the following Table. T,%

It will be seen from the above results that the pigment prepared according to the present invention had a higher durability as represented by gloss retention than that of the control pigment when exposed in the form of a paint to severe weathering conditions in the weatherometer. In addition the pigment of the present invention had an opacity substantially the same as that of the control and accordingly to a superior pigment.

What is claimed is:

1. A process for the production of pigmentary titanium dioxide which comprises forming an aqueous suspension or slurry of particles of titanium dioxide containing a water-soluble silicate, adding an acidic water soluble salt of aluminium while maintaining the pH of the suspension at a value of 3 to 4.5 and thereby precipitating a hydrous oxide of silicon on the particles and raising the pH of the suspension or slurry to effect complete precipitation of a hydrous oxide of aluminium on the hydrous oxide of silicon coated particles.

2. A process according to claim 1 in which the pH is maintained at a value of from 3.5 to 4.2 while adding the acidic salt of aluminium.

3. A process according to claim 1 in which the pH is maintained at a value of from 3.8 to 4.2.

4. A process according to claim 1 in which an alkali is added to the suspension or slurry simultaneously with the acidic salt of aluminium.

5. a process according to claim 1 in which a source of a phosphate is added to the aqueous suspension or slurry after the addition of the acidic salt of aluminium.

6. A process according to claim 1 in which the pH of the suspension is raised to at least 5 to effect complete precipitation of the hydrous oxide of aluminium.

7. A process according to claim 6 in which the pH is raised to at least 7.5.

8. a process according to claim 1 in which the amount of the hydrous oxide of silicon precipitated is from 0.5% to 20% expressed as $SiO_2$ on the weight of $TiO_2$.

9. A process according to claim 8 in which the amount of hydrous oxide of silicon is from 2 to 6% by weight expressed as $SiO_2$ on the weight of $TiO_2$.

10. A process according to claim 1 in which the amount of hydrous oxide of aluminium which is precipitated is from 0.1% to 15% expressed as $Al_2O_3$ by weight of $TiO_2$.

11. A process according to claim 10 in which the amount of hydrous oxide of aluminium is from 0.5 to 5% by weight of $TiO_2$.

12. A process according to claim 1 in which sufficient of the acidic salt of aluminium is added to the suspension or slurry initially to precipitate the hydrous oxide of silicon followed by the remainder of the acidic salt of aluminium.

13. A process according to claim 1 in which after the precipitation of the hydrous oxide of aluminium a further coating is applied by adding to the suspension of titanium dioxide a water-soluble hydrolysable compound of aluminium, titanium, cerium zinc, zirconium or silicon and adjusting the pH of the suspension to effect precipitation of the coating on the coated particles.

14. A process according to claim 1 in which the titanium dioxide is rutile titanium dioxide pigment prepared by the vapour phase oxidation off a titanium tetrahalide.

* * * * *